Dec. 7, 1943. W. E. FIELDS ET AL 2,336,350
BRAKE
Filed April 20, 1942 2 Sheets-Sheet 1

INVENTORS
WILLIAM E. FIELDS
WILLIAM E. BERRY
BY
ATTORNEY

INVENTORS
WILLIAM E. FIELDS
WILLIAM E. BERRY
BY
ATTORNEY

Patented Dec. 7, 1943

2,336,350

UNITED STATES PATENT OFFICE 2,336,350

BRAKE

William E. Fields and William E. Berry, South Bend, Ind., assignors to Bendix Aviation Corporation, South Bend, Ind., a corporation of Delaware Application April 20, 1942, Serial No. 439,652

7 Claims. (Cl. 188—79.5)

This invention relates to brakes and particularly to mechanical means for controlling the friction elements of a brake.

We have chosen to illustrate our invention as embodied in an auxiliary or parking mechanical brake applying means which supplement hydraulic service brake applying means in a brake of the type having a plurality of individually shiftable friction elements or shoes. The chief value of our invention lies in its utilization in such a brake, although it may be utilized in a brake of any type including a well known type of brake which has a pair of shoes each pivoted at one end thereof applied by applying means between the free ends of the shoes and including an equally well known type of brake which has a pair of shoes fixed together at one end with applying means between the shoes at their other ends, both shoes being movable as a unit to anchor adjacent the applying means, the direction or shift of the shoes depending upon the direction of drum rotation.

The chief object of our invention is to provide mechanical auxiliary or parking brake applying means of the type which spread a pair of shoes at one end thereof while the other ends of the shoes serve as pivots, in conjunction with a hydraulic or mechanical service brake actuator which exerts applying force on both ends of both shoes simultaneously.

A second object is to provide an auxiliary mechanical brake actuator which is applied through an adjusting element, using the adjusting element as a thrust link. As the brakes of a vehicle wear, it is necessary that they be adjusted to maintain them in proper condition. Where both service and auxiliary means are used in applying the brakes, it is desirable that a single adjustment serve to adjust for both said service and auxiliary brake applying means. Adjustment of the brakes is accomplished by moving the brake shoes radially toward the brake drum without increasing the movement necessary in the brake applying means before spreading force can be exerted on the shoes. If the service brakes are adjusted without also adjusting the auxiliary brake applying means, the brake shoes will move away from the auxiliary brake applying means with the result that there will be slack in the auxiliary brake applying system. Our invention provides for simultaneous adjustment of both the service and auxiliary brake applying means by utilizing mechanical auxiliary brake applying means which apply through the adjusting element and a hydraulic service brake which has light hydraulic pressure at all times maintained in the lines so that the pistons in the cylinders which spread the brake shoes automatically follow up the shoes as the position of the shoes is changed by adjustment.

Among other objects of our invention are: to provide a brake which is both effective in operation and simple in construction, and to make possible in a brake of the two individually shiftable shoe types the utilization of hydraulic motors of standard construction.

Other objects and features of our invention will become apparent during the following description, reference being had therein to the accompanying drawings, in which.

Figure 1:
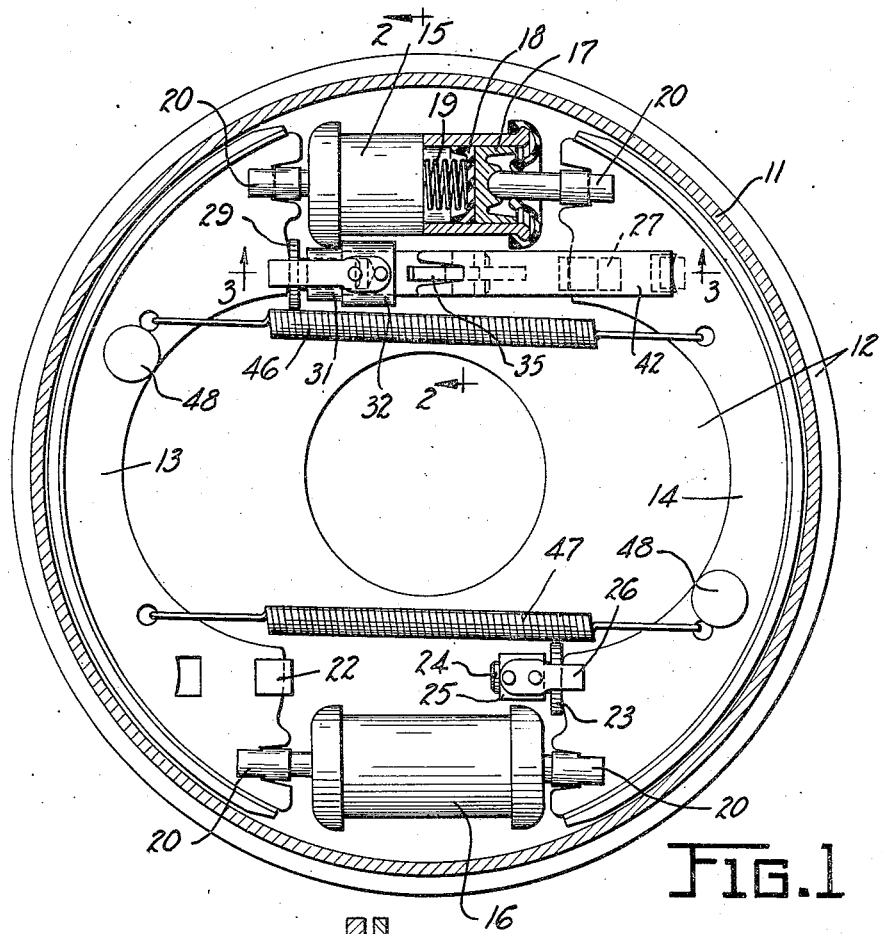
Figure 1 is a vertical section taken through a wheel brake assembly on a plane just inside the head of the brake drum.
Figure 2:
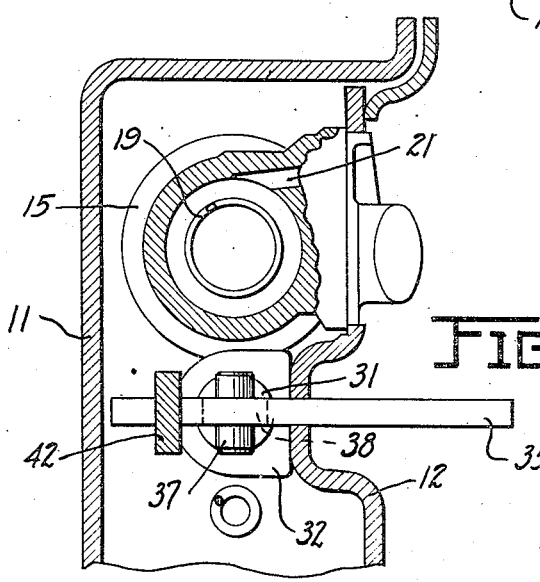
Figure 2 is a section taken on the line 2—2 of Figure 1.

The brake of Figure 1, used to illustrate our invention, comprises in general a rotatable brake drum 11, a non-rotatable backing plate or support 12, and a pair of brake shoes 13 and 14, mounted on the backing plate and adapted to be at times moved into contact with the drum to impede the rotation thereof. A pair of hydraulic cylinders 15 and 16 of the conventional type may be placed between the shoes 13 and 14 at opposite sides of the drum for moving the shoes against the drum in response to hydraulic pressure. Part of cylinder 15 is cut away to show the interior thereof and, since the two cylinders are identical, description of cylinder 15 will suffice for both. The cylinders each have a pair of pistons 17 having sealing cups 18 on the faces thereof, and each cylinder having a compression spring 19 between the two sealing cups 18. Each piston in each cylinder is connected by a thrust link 20 to the adjacent end of one of the brake shoes. Fluid under pressure may be admitted to the cylinders through a port 21 (see Fig. 2) from a conduit leading to a master cylinder or pressure producing device. An anchor is provided at each end of each shoe so that the shoes may shift individually to anchor at either end thereof according to the direction of drum rotation at the time the shoes come into contact with the drum. This shifting of the shoes as is well known in the art, occurs as a result of the wrapping effect of the drum on the shoes, friction between the drum and shoes tending to carry the shoes along with the drum as it rotates. The lower end of shoe 13 (see Fig. 1) is adapted to anchor in one direction of rotation against a member 22 which has one side folded over the web of the shoe and the other side secured to the backing plate by, for example, welding or brazing in order that the anchoring torque of the shoe may be transmitted to the backing plate. The lower end of shoe 14 (see Fig. 1) is adapted to anchor against an adjusting screw having a head 23 which the shoe web may contact and a stem 24 threaded into an anchor block 25 which is secured by suitable means, as for example welding or brazing, to the backing plate 12. The head 23 of the adjusting screw is formed as a ratchet having a plurality of teeth and a member 26 fixed to the anchor block 25 has a pawl in contact with the ratchet teeth on the head 23 to prevent unwanted turning of the adjusting screw.

Figure 3:
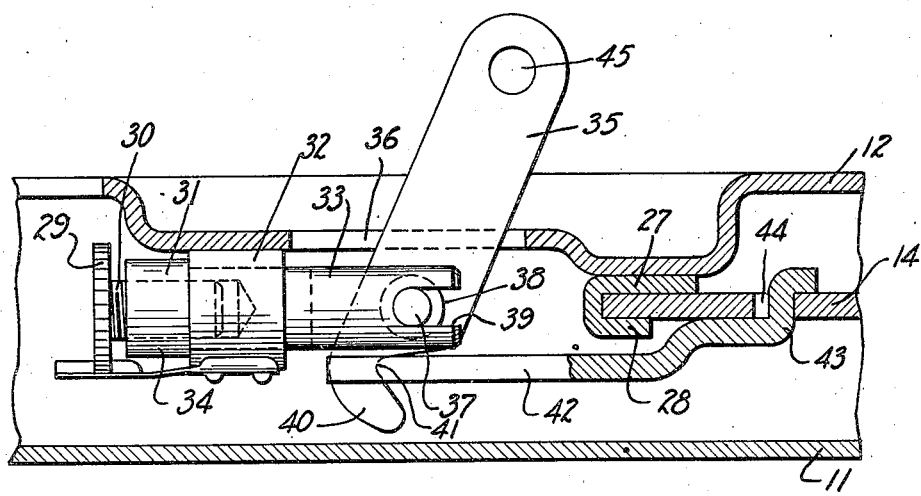
Figure 3 is a section taken on the line 3—3 of Figure 1.

Adjacent the upper ends of the shoes 13 and 14 are provided anchoring means for at times receiving the anchoring torque of the shoes combined with mechanical auxiliary brake applying means. The anchoring means for the upper ends of the shoes and the auxiliary mechanical applying means can be seen most clearly in Figures 2 and 3. Referring to Fig. 3 we note that the upper end of shoe 14 may anchor against a member 27 which is similar to the member 22 at the lower end of shoe 13, member 27 having a flange 28 folded over the web of shoe 14 and said member being secured to the backing plate 12 by welding or other suitable means. The upper end of shoe 13 like the lower end of shoe 14 is adapted to anchor against an adjusting screw which has a head 29 for the shoe to contact and a stem 30. The stem 30, however, is screwed, not directly into the anchor block, but into a thrust member 31 which in turn extends through an opening in an anchor block 32, the block being secured to the backing plate 12 by suitable means. The thrust member 31 has a stem 33 extending through anchor block 32 and an enlarged head 34 the edges of which may contact the edges of anchor block 32 to transmit the anchoring torque of shoe 13 to the backing plate. The thrust element 31 is adapted also to serve as a part of the auxiliary mechanical applying linkage. The lower end of the stem of thrust element 31 is forked to receive an applying lever 35 which extends through an opening 36 in the backing plate. A pin 37 extends through an opening 38 in the lever 35, the pin at the point where it goes through the lever having a diameter equal to the diameter of the opening 38 and having reduced portions on either side of the lever, said reduced portions being arranged to fit into slots 39 in the forks of the thrust element 31 and to bear against the end of the slots 39 so that force may be exerted by the lever 35 through the pin 37 against the thrust element 31 tending to move it toward the left. The lever 35 has a hook 40 on the end thereof which forms with the body of the lever a depression 41 the inside surface of which is pivoted against the bottom of a notch formed in one end of a thrust link 42 the other end of which has a flange 43 extending through an opening 44 in the web of shoe 14 and bearing against the web of shoe 14 so that force may be exerted by the lever 35 through the thrust element 42 against the upper end of the shoe. A cable or other suitable force applying means may be connected at 45 to the end of lever 35 outside the backing plate. A pair of return springs 46 and 47 are stretched across the brake between the shoes to hold both ends of both shoes against the several anchors until such time as one of the shoe spreading means is actuated. Also, a plurality of steady rests 48 may be provided to eliminate the lateral movement of the brake shoes toward and away from the head of the brake drum and the plane surface of the backing plate.

Figure 4:
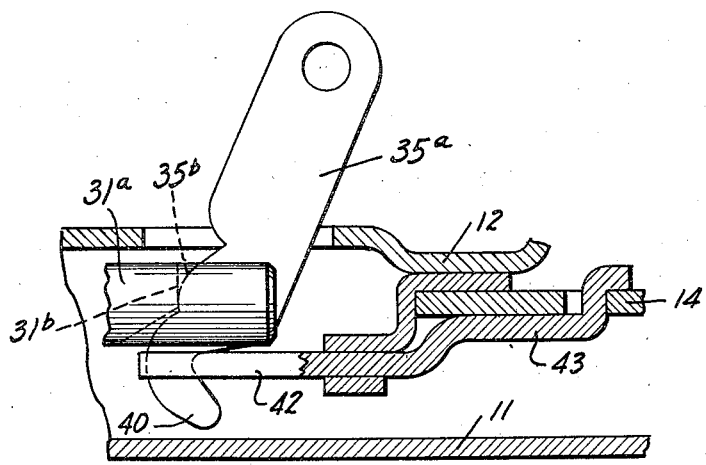
Figure 4 is a section showing a modification of the shoe spreading means of Figure 3.

Figure 4 shows an optional method of mounting the backing plate lever. In this figure the lever 35a has, on the side toward thrust member 31a and intermediate its length, a cam surface 35b. The thrust element 31a is provided with a slot whose shape is determined by a surface 31b, one part of which is normal to the axis of thrust member 31a, the other part being inclined to said axis. It will be noted that no pin is necessary to connect lever 35a to thrust member 31a, since surface 35b of the lever bears against surface 31b of the thrust member. This construction is somewhat less expensive than the construction of Figures 1 to 3.

Although we have described certain specific embodiments of our invention, it is not our intention to limit the scope thereof to such embodiments, but only by the terms of the following claims.

We claim:

1. A brake assembly comprising a rotatable brake drum, a non-rotatable support, a pair of arcuate brake shoes mounted on the support and individually shiftable to anchor at either end according to the direction of drum rotation, means at each end of each shoe for taking the anchoring torque thereof depending on the direction of shift of the shoes, means for adjusting the radial position of the shoes to compensate for shoe wear, a pair of hydraulic motors between the shoes at opposite sides of the drum for exerting spreading force on the shoes simultaneously at both ends of both shoes, and brake applying means auxiliary to the hydraulic motors including a thrust member having anchoring contact with one of the torque taking means and serving as support for one of the adjusting means.

2. A brake assembly comprising a rotatable brake drum, a non-rotatable support, a plurality of arcuate brake shoes mounted on the support, means for adjusting the radial position of the shoes to compensate for shoe wear, a hydraulic motor between the shoes for exerting spreading force thereon, and brake applying means auxiliary to the hydraulic motor including a thrust member serving as support for one of the adjusting means.

3. A brake assembly comprising a rotatable brake drum, a non-rotatable support, a pair of arcuate lined brake shoes mounted on the support and individually shiftable to anchor at either end according to the direction of drum rotation, means at each end of each shoe for taking the anchoring torque thereof depending on the direction of shift of the shoes, means for adjusting the radial position of the shoes to compensate for shoe lining wear, a pair of hydraulic motors between the shoes at opposite sides of the drum for exerting spreading force on the shoes simultaneously at both ends of both shoes, and brake applying means auxiliary to the hydraulic motors including a thrust member having anchoring contact with one of the torque taking means and serving as support for one of the adjusting means.

4. A brake assembly comprising a rotatable brake drum, a non-rotatable support, a pair of arcuate brake shoes mounted on the support and individually shiftable to anchor at either end according to the direction of drum rotation, means at each end of each shoe for taking the anchoring torque thereof depending on the direction of shift of the shoes and for positioning the shoes in release, means for adjusting the radial position of the shoes to compensate for shoe wear, a pair of hydraulic motors between the shoes at opposite sides of the drum for exerting spreading force on the shoes simultaneously at both ends of both shoes, and brake applying means auxiliary to the hydraulic motors, including a thrust member having anchoring contact with one of the torque taking means and serving as support for one of the adjusting means.

5. A brake assembly comprising a rotatable brake drum, a non-rotatable support, a pair of arcuate brake shoes mounted on the support and individually shiftable to anchor at either end according to the direction of drum rotation, means at each end of each shoe for taking the anchoring torque thereof depending on the direction of shift of the shoes, means associated with at least two of the torque taking means for adjusting the radial position of the shoes to compensate for shoe wear, a pair of hydraulic motors between the shoes at opposite sides of the drum for exerting spreading force on the shoes simultaneously at both ends of both shoes, and brake applying means auxiliary to the hydraulic motors including a thrust member having anchoring contact with one of the torque taking means and serving as support for one of the adjusting means.

6. Brake applying means comprising a support, two brake shoes, an anchor block fixed to the support, a thrust member having a stem extending through the anchor block and a head adapted to anchor on the block, an adjusting element screwed into the thrust member and having a surface in contact with the end of one of the shoes, a thrust link contacting the end of the other shoe, and a lever between the shoes pivoted to the thrust member and the thrust link to force them apart and spread the shoes.

7. Brake applying means comprising a support, a pair of brake shoes, an anchor block fixed to the support, a thrust member having a stem extending through the anchor block and a head adapted to anchor on the block, an adjusting element screwed into the thrust member and having a surface in contact with the end of one of the shoes, a thrust link contacting the end of the other shoe, and a lever having a cam surface between the shoes adapted to rotate about the thrust member and having a projection adapted to engage said thrust link to force said thrust link and said thrust member apart to spread the shoe.

WILLIAM E. FIELDS.
WILLIAM E. BERRY.